United States Patent
Benazzi et al.

(10) Patent No.: US 6,527,945 B2
(45) Date of Patent: Mar. 4, 2003

(54) CATALYST COMPRISING A PHYLLOSILICATE CONTAINING BORON AND/OR SILICON, AND A HYDROCRACKING PROCESS

(75) Inventors: Eric Benazzi, Chatou (FR); Slavik Kasztelan, Malmaison (FR); Nathalie George-Marchal, Saint Genis Laval (FR)

(73) Assignee: Institut Francais du Petrole, Malmaison Cedex (FR)

( * ) Notice: Subject to any disclaimer, the term of this patent is extended or adjusted under 35 U.S.C. 154(b) by 123 days.

(21) Appl. No.: 09/850,078

(22) Filed: May 8, 2001

(65) Prior Publication Data

US 2002/0045542 A1 Apr. 18, 2002

Related U.S. Application Data

(62) Division of application No. 09/310,182, filed on May 12, 1999, now Pat. No. 6,235,670.

(30) Foreign Application Priority Data

May 13, 1998 (FR) .............................................. 98 06006

(51) Int. Cl.$^7$ .............................................. C10G 47/02
(52) U.S. Cl. ................ 208/111.3; 208/110; 208/111.01; 208/111.35
(58) Field of Search ................................. 208/109, 110, 208/111.01, 111.3, 111.35

(56) References Cited

U.S. PATENT DOCUMENTS

| | | | | |
|---|---|---|---|---|
| 5,556,824 A | * | 9/1996 | Sudhakar et al. | 502/202 |
| 5,609,750 A | * | 3/1997 | Nat et al. | 208/122 |
| 5,961,816 A | * | 10/1999 | Benazzi et al. | 208/111.3 |
| 5,997,725 A | * | 12/1999 | Benazzi et al. | 208/111.3 |
| 6,037,300 A | * | 3/2000 | Kasztelan et al. | 502/204 |
| 6,235,670 B1 | * | 5/2001 | Benazzi et al. | 502/63 |

* cited by examiner

*Primary Examiner*—Tom Dunn
*Assistant Examiner*—Christina Ildebrando
(74) *Attorney, Agent, or Firm*—Millen, White, Zelano & Branigan, P.C.

(57) ABSTRACT

The invention concerns a catalyst comprising at least one matrix, at least one dioctahedral 2:1 phyllosilicate which is optionally synthesised in a fluorine-containing medium and optionally bridged, at least one metal selected from elements from group VIB and/or group VIII of the periodic table, boron and/or silicon, optionally phosphorous, optionally at least one group VIIA element, and optionally at least one group VIIB element. The invention also concerns the use of the catalyst for hydrocracking hydrocarbon-containing feeds.

15 Claims, No Drawings

CATALYST COMPRISING A PHYLLOSILICATE CONTAINING BORON AND/OR SILICON, AND A HYDROCRACKING PROCESS

This application is a division of Ser. No. 09/310,182, filed on May 12, 1999, now U.S. Pat. No. 6,235,670.

The present invention relates to a catalyst comprising at least one metal selected from metals from group VIB and/or VIII (group 6 and groups 8, 9 and 10 in the new periodic table notation: Handbook of Chemistry and Physics, 76th edition, 1995–1996, inside front cover), associated with a support comprising at least one porous amorphous or low crystallinity oxide type matrix and at least one clay selected from the group formed by 2:1 octahedral phyllosilicates and trioctahedral 2:1 phyllosilicates. The catalyst support comprises at least one promoter element which is boron and/or silicon, optionally phosphorous, optionally at least one group VIIA element (group 17, the halogens), in particular fluorine, and optionally at least one group VIIB element.

The present invention also relates to processes for preparing said catalyst, and to its use for hydrocracking hydrocarbon-containing feeds such as petroleum cuts and cuts from coal. The feeds contain aromatic and/or olefinic and/or naphthenic and/or paraffinic compounds, said feeds possibly containing metals and/or nitrogen and/or oxygen and/or sulphur.

Hydrocracking is gaining in importance in refining as the need to convert heavy fractions into lighter fractions which can be upgraded as fuels increases. This results from the increasing demand for fuels. Such upgrading involves a relatively large reduction in the molecular weight of the heavy constituents which can, for example, be achieved through cracking reactions.

The catalytic hydrocracking process uses catalysts containing a hydrogenating, desulphurising and denitrogenating function provided by the active phase based on transition metals, and an acidic function, generally provided by the amorphous matrix or a zeolite, or a mixture thereof. A good hydrocracking catalyst will be constituted by a properly adjusted hydrogenating function and acidic function. Hydrocracking is used to treat feeds such as vacuum gas oils, atmospheric or vacuum residues, which may or may not be deasphalted. Hydrocracking can produce highly purified lighter cuts, i.e., with a low sulphur, nitrogen and metals content.

Increasing the activity and selectivity of hydrocracking catalysts is thus important. One means consists of acidifying the matrix without poisoning the activity of either the transition-metal based hydrogenating phase or the cracking activity of the zeolite-based acidic phase.

The invention thus relates to a catalyst for hydrocracking hydrocarbon-containing feeds. The catalyst contains at least one metal selected from group VIB and group VIII of the periodic table. The catalyst also comprises at least one clay selected from the group formed by dioctahedral 2:1 phyllosilicates and trioctahedral 2:1 phyllosilicates such as kaolinite, antigorite, chrysotile, montmorillonite, beidellite, vermiculite, talc, hectorite, saponite, or laponite. The catalyst preferably contains a dioctahedral 2:1 phyllosilicate synthesised in a fluoride medium and optionally bridged, said phyllosilicate preferably having a large interplanar spacing. The catalyst also comprises at least one amorphous or low crystallinity matrix acting as a binder. The catalyst is characterized in that it also comprises boron and/or silicon, optionally phosphorous, optionally at least one group VIIA element, preferably fluorine, and optionally at least one group VIIB element, for example manganese, technetium or rhenium.

The catalyst has a higher hydrocracking activity than that of prior art catalytic formulae based on clay. Without wishing to be bound to a particular theory, it appears that this particularly high activity of the catalysts of the present invention is due to the acidity of the catalyst being reinforced by the presence of boron and/or silicon, in particular on the matrix, which causes an improvement in the hydrocracking properties compared with catalysts in routine use.

More precisely, the present invention provides a catalyst comprising at least one dioctahedral 2:1 phyllosilicate, which is optionally bridged. When it is bridged, the interplanar spacing is at least $2.0 \times 10^{-9}$ m and comprises struts based on at least one compound selected from the group formed by $SiO_2$, $Al_2O_3$, $TiO_2$, $ZrO_2$ and $V_2O_3$, or any combination thereof.

The interplanar spacing $d_{001}$ of the dioctahedral 2:1 phyllosilicates of the invention (preferably previously prepared in a fluoride medium in the presence of HF acid and/or another source of fluoride ions) is preferably at least $2.0 \times 10^{-9}$ m, more preferably at least $2.65 \times 10^{-9}$ m, more preferably more than $2.8 \times 10^{-9}$ m and still more preferably still at least $3.3 \times 10^{-9}$ m, and generally $6.0 \times 10^{-9}$ m or less, preferably $5.0 \times 10^{-9}$ m. The interplanar spacing, represented by $d_{001}$, represents the sum of the thickness of a sheet and the space between the sheets. This value can be directly obtained using a conventional orientated powder X ray diffraction method.

Dioctahedral 2:1 phyllosilicates are minerals which are formed by layering elementary sheets. Although the chemical bonds between the elements of the phyllosilicate structure are ionocovalent, they will be assumed to be ionic, to simplify the description.

From a representation where the $O^{2-}$ ions are in a plane in contact with each other, it is possible to produce a plane with a hexagonal cavity, termed the hexagonal plane, by withdrawing alternate $O^{2-}$ ions from a row of two $O^{2-}$ ions.

The structure of a dioctahedral 2:1 phyllosilicate can be simply represented by arrangements of hexagonal planes of $O^{2-}$ ions and compact planes of $O^{2-}$ and OH ions. The OH ions fill the cavities in the hexagonal planes of $O^{2-}$ ions.

Superimposition of two compact planes sandwiched by hexagonal planes defines an octahedral layer (O) between two tetrahedral layers (T) giving the sheet denomination TOT.

Such an arrangement, also termed 2:1, defines a plane of octahedral cavities located in the octahedral layer between two planes of tetrahedral cavities, one in each tetrahedral layer. Each tetrahedron has one $O^{2-}$ ion in common with the octahedral layer and each of the three other $O^{2-}$ ions is shared with another tetrahedron in the same tetrahedral layer.

The crystalline lattice is thus constituted by 6 octahedral cavities each having 4 tetrahedral cavities either side. In the case of a phyllite constituted by the elements Si, Al, O, H, such an arrangement corresponds to the ideal formula 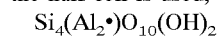$(Al_4 \cdot_2)O_{20}(OH)_4$. The tetrahedral cavities contain the element silicon, and the octahedral cavities contain the element aluminium but in this case one octahedral cavity in three is empty (•). Such an assembly is electrically neutral. Usually, the half-cell is used, with formula $Si_4(Al_2 \cdot)O_{10}(OH)_2$ The tetrahedral element silicon can be substituted by trivalent elements such as aluminium or gallium or iron ($Fe^{3+}$). Similarly, the octahedral element aluminium can be substituted by:

the trivalent elements cited above, or a mixture of those elements;

divalent elements, for example magnesium.

These substitutions result in an overall negative charge in the structure. This necessitates the existence of exchangeable compensating cations located in the space between the sheets. The thickness of the space between the sheets depends on the nature of the compensating cations and their hydration. This space is also capable of accepting other chemical species such as water, amines, salts, alcohols, or bases.

The existence of —OH groups causes thermal instability due to a dehydroxylation reaction with equation:

2-OH→-O-+H$_2$O.

In this respect, and without wishing to be bound to a particular theory, it can be considered that the introduction of the element fluorine into the structure during synthesis in place of the O—H groups produces phyllosilicates with greatly improved thermal stability.

The preferred phyllosilicates of the invention are dioctahedral 2:1 phyllosilicates the characteristics of which are given below, into which struts have been introduced into the space between the sheets (the struts being selected from $S_2O_2$, $Al_2O_3$, $TiO_2$, $ZrO_2$, $V_2O_5$), so as to produce an interplanar spacing $d_{001}$ of at least $2.0 \times 10^{-9}$ m.

The general chemical formula (for a half-cell) of dioctahedral 2:1 phyllosilicates, preferably synthesised in a fluoride medium in the presence of HF acid and/or another source of fluoride anions, before bridging is as follows:

$$M^{m+}x/m((Si_{(4-x)}T_x)(T_{2\ 1})O_{10}(OH_{(2-y)}F_y)^{x-}$$

where

T represents an element selected from the group formed by elements from group IIIA (such as B, Al, Ga) and iron;

M is at least one compensating cation selected from the group formed by cations of elements from groups IA, IIA and VIII, organic cations containing nitrogen, the ammonium cation, and rare earth cations. The cation originates from the reaction medium or is introduced by at least one exchange process. Advantageously, the cation from the reaction medium is selected from the group formed by alkalis (except lithium), the ammonium cation ($NH_4^{30}$), organic cations containing nitrogen (including alkylammonium and arylammonium) and organic cations containing phosphorous (including alkylphosphonium and arylphosphonium). M can also be a compensating cation introduced by post-synthesis ion exchange, selected from the group formed by cations of elements from groups IA, IIA and VIII of the periodic table, rare earth cations (cations of elements with atomic number 57 to 71 inclusive), organic cations containing nitrogen (including alkylammonium and arylamnmonium) and the ammonium cation;

m is the valency of cation M;

x is a number which is in the range 0 to 2, preferably in the range 0.1 to 0.8;

y is a number which is in the range 0 to 2; if the phyllosilicate contains fluorine, Y is greater than 0:

and represents an octahedral cavity.

The X ray diffraction diagram of the dioctahedral 2:1 phyllosilicate before bridging is characterised by the presence of the following lines:

a characterising line, $d_{060}$, at $1.49 \pm 0.01 \times 10^{-9}$ m for a dioctahedral 2:1 phyllosilicate comprising an octahedral layer with the composition $Si(Al_2)$;

at least one 001 reflection such that $d_{001}$ is $1.25 \pm 3 \times 10^{-10}$ m depending on the nature of the compensating cation and its hydration at the humidity under consideration.

Preferably, the fluorine content is such that the F/Si molar ratio is in the range 0.1 to 4, preferably 0.1 to 2.

The dioctahedral 2:1 phyllosilicate also exhibits at least one signal in $^{19}F$ NMR, with magic angle spinning, determined as is well known to the skilled person. The chemical displacement of this signal also depends on the composition of the octahedral layer. Thus it corresponds to a value of:

–133 ppm (±5 ppm) for $^{19}F$ NMR, with magic angle spinning when the first neighbours of the F are two aluminium atoms, corresponding to an octahedral layer with the composition $Si(Al_2)$;

–108 ppm (±5 ppm) For $^{19}F$ NMR, with magic angle spinning when the first neighbours of the F are two gallium atoms, corresponding to an octahedral layer with the composition $Si(Ga_2)$;

–118 ppm (±5 ppm) for $^{19}F$ NMR, with magic angle spinning when the first neighbours of the F are an aluminium atom and a gallium atom, corresponding to an octahedral layer with the composition $Si(Ga, Al)$.

The phyllosilicates are advantageously synthesised in a fluoride medium in the presence of HF acid and/or another source of fluoride anions and at a pH of less than 9, preferably in the range 0.5 to 6.5.

The preparation of these types of solids in a fluoride medium and their characterisation are described in the following references, the disclosures of which are hereby included in the present description: French patent FR-A-2 673 930, a publication of the 202$^{nd}$ meeting of the American Chemical Society (ACS) in New York in August 1991, published in "Synthesis of Microporous Materials, Extended Clays and Other Microporous Solids" (1992), and a report of the "Academie des Sciences Paris, t. 315, Series II, p. 545–549, 1992.

The dioctahedral 2:1 phyllosilicates described above can advantageously contain fluorine and are bridged, for example using a novel process comprising the following steps:

The dioctahedral 2:1 phyllosilicate, preferably in its ammonium form ($NH_4^+$), is suspended in a solution of a surfactant with a concentration in the range 0.01 mole/litre to 1 mole/litre, preferably in the range 0.05 to 0.7 mole/litre, Suitable surfactants for use in this step are anionic surfactants, non limiting examples of which are alkylsulphates and alkylsulphonates, or cationic surfactants, including tetraalkylammonium halides or hydroxides such as cetyltrimethylammonium chloride or geminal alkylammonium compounds. Examples are hexadecyltrimethylammonium bromide, ethylhexadecyldimethylammonium bromide, octadecyltrimethylammonium bromide, dodecyltrimethylammonium bromide, and didodecyldimethylammonium bromide. Other surfactants can also be used, for example triton X-100, polyethylene oxide (POE).

After a contact period, during which the medium is stirred, for example, taking 5 minutes to 12 hours, preferably 15 minutes to 6 hours, and more preferably 15 minutes to 3 hours, the medium is filtered then washed with distilled water and finally dried in air or an inert gas, for example at a temperature in the range 40° C. to 150° C.; for a period in the range 5 minutes to 24 hours, preferably in the range 30 minutes to 12 hours. When the phyllosilicate is not in the ammonium form, it can first undergo any treatment which is known to the skilled person to obtain the dioctahedral 2:1 phyllosilicate mainly in its ammonium form. A non limiting example of a treatment to carry out this transformation is an ion exchange step using aqueous solutions of an ammonium salt (ammonium nitrate and/or ammonium chloride).

The dioctahedral 2:1 phyllosilicate treated using the operating procedure described in the preceding step is then brought into contact with a mixture comprising:

at least one $RNH_2$ type primary amine or a R'RNH secondary amine, where R' and R are advantageously selected from the group formed by carbon-containing groups, alkyl, isoalkyl and naphthenyl groups, and aromatic groups which may or may not be substituted with other groups and which may contain 1 to 16 carbon atoms;

at least one alkoxide of an element or a mixture of alkoxides, the element being selected from the group formed by silicon, aluminium, zirconium, titanium and vanadium, with general formula $M(OR)_n$, where M is the element described above, n is the valency of said element and R is a group advantageously selected from the group formed by alkyl, isoalkyl and naphthenyl groups and aromatic groups which may or may not be substituted. The different groups —OR may be identical or different depending on the nature of group R selected from the group defined above.

It is left in contact, preferably with stirring, for example for a period in the range 5 minutes to 12 hours, preferably in the range 5 minutes to 8 hours.

The bridged dioctahedral 2:1 phyllosilicate is then filtered and dried in air or in an inert gas, for example at a temperature in the range 40° C. to 150° C., for a period in the range 5 minutes to 24 hours, preferably in the range 30 minutes to 12 hours.

This bridging process can simply and rapidly introduce $SiO_2$, $Al_2O_3$, $TiO_2$, $ZrO_2$, $V_2O_5$ struts or a mixture of these struts into the space between the sheets of the dioctahedral 2:1 phyllosilicates, advantageously prepared in a fluoride medium.

In common with the base dioctahedral 2:1 phyllosilicate, the phyllosilicate of the invention has an X ray diffraction spectrum, which enables the interplanar spacing $d_{001}$ to be calculated which is substantially increased to at least $2.0 \times 10^{-10}$ m. The specific surface area is also observed to have increased, generally between 200 and 1000 $m^2/g$, preferably between 250 and 700 $m^2/g$. The $d_{060}$ lines of the X ray diffraction spectrum and the NMR lines of the $^{19}F$ magic angle rotation spectrum are preserved.

The catalyst of the present invention thus also comprises at least one amorphous or low crystallinity porous mineral matrix, generally an oxide. Non limiting examples are aluminas, silicas, silica-aluminas. Aluminates can also be used. Preferably, matrices containing alumina in any of its forms which are known to the skilled person, preferably gamma alumina, are used.

The catalyst also comprises a hydrogenating function. The hydrogenating function per se, which has been defined above, i.e., at least one metal selected from group VIB and/or group VIII, can be introduced into the catalyst at various stages in the preparation and in a variety of manners.

The catalyst is also characterized in that it comprises a promoter element such as boron or silicon and optionally phosphorous. It optionally contains at least one group VIIA element, preferably fluorine, and optionally at least one group VIIB element.

The catalyst of the present invention generally comprises, in weight % with respect to the total catalyst weight:

0.1% to 60%, preferably 0.1% to 50%, more preferably 0.1% to 40%, of at least one metal selected from group VIB and group VIII (the % being expressed as the % of oxide);

0.1% to 99%, preferably 1% to 99%, of at least one amorphous or low crystallinity porous mineral matrix (generally an oxide);

0.1% to 90%, preferably 0.1% to 80%, more preferably 0.1% to 70%, of at least one dioctahedral 2:1 phyllosilicate, preferably synthesised in a fluoride medium, optionally bridged, said phyllosilicate when bridged preferably having a large interplanar spacing of at least $2.0 \times 10^{-10}$ m;

said catalyst further comprising:

0.1% to 20%, preferably 0.1% to 15%, more preferably 0.1% to 10%, of boron and/or silicon in its amorphous form, deposited on the support and principally located on the support matrix (the % being expressed as the % of oxide); and optionally:

0 to 20%, preferably 0.1% to 15%, more preferably 0.1% to 10%, of phosphorous (the % being expressed as the % of oxide);

0 to 20%, preferably 0.1% to 15%, more preferably 0.1% to 10%, of at least one element selected from group VIIA (halogens), preferably fluorine;

0 to 20%, preferably 0.1% to 15%, more preferably 0.1% to 10%, of at least one element selected from group VIIB (the % being expressed as the % of oxide).

The group VIB, group VIII and group VIIB metals in the catalyst of the present invention can be completely or partially present in the form of the metal and/or oxide and/or sulphide.

The catalysts of the invention can be prepared using any suitable method. In general, a support is prepared comprising a porous matrix selected from the group formed by amorphous or low crystallinity matrices, at least one clay selected from the group formed by dioctahedral 2:1 phyllosilicates and trioctahedral octahedral 2:1 phyllosilicates, on which at least one metal selected from the group formed by group VIB and group VIII metals is deposited, then the support is impregnated with at least one solution selected from aqueous solutions of boron and silicon. Preferably, the silicon and boron are introduced into the catalyst already containing the support and at least one metal selected from the group formed by group VIII and VIIB elements, and optionally group VIIB elements.

Preferably, a catalyst, for example a conventional hydrocracking catalyst of NiMo or NiMoP type containing a support comprising a mixture of alumina and at least one dioctahedral 2:1 phyllosilicate, preferably synthesised in a fluoride medium then bridged, said phyllosilicate having a large interplanar spacing, is impregnated with an aqueous boron solution then with an aqueous silicon solution (or the reverse, the silicon solution then the boron solution) or is impregnated with a common aqueous solution containing boron and silicon.

The promoter element, in particular silicon introduced onto the support of the invention, is principally located on the matrix of the support and can be characterized by techniques such as a Castaing microprobe (distribution profile of the various elements), transmission electron microscopy coupled with X ray analysis of the catalyst components, or by producing a distribution map of the elements present in the catalyst by electronic microprobe. These local analyses can furnish the location of the various elements, in particular that of the promoter element, especially that of the amorphous silica on the support matrix due to introduction of the silicon promoter. The location of the silicon on the framework of the zeolite contained in the support is also revealed. Further, a quantitative estimate of the local silicon contents or other promoter elements can be carried out.

In addition, $^{29}$Si NMR with magic angle spinning is a technique which can detect the presence of the amorphous silica introduced into the catalyst using the procedure described in the present invention.

The invention also relates to a process for preparing said catalyst. More particularly, a process for preparing the catalyst of the present invention comprises the following steps:

a) drying and weighing a solid hereinafter termed the precursor, comprising at least the following compounds: a amorphous or low crystallinity porous matrix; at least one clay selected from the group formed by dioctahedral 2:1 phyllosilicates and trioctahedral 2:1 phyllosilicates, preferably dioctahedral 2:1 phyllosilicates, preferably synthesised in a fluoride medium and optionally bridged, said phyllosilicate having a large interplanar spacing; at least one element from group VIB; and/or at least one element from group VIII; and optionally phosphorous, the whole preferably being formed;

b) impregnating the precursor defined in step a) with an aqueous solution containing boron and/or silicon, optionally phosphorous and optionally at least one group VIIA element, preferably F;

c) leaving the moist solid in a moist atmosphere at a temperature in the range 10° C. to 80° C.;

d) drying the moist solid obtained in step b) at a temperature in the range 60° C. to 150° C.;

e) calcining the solid obtained from step c) at a temperature in the range 150° C. to 800° C.

Step b) above can be carried out using conventional methods known to the skilled person.

One preferred method of the invention consists of preparing an aqueous solution of at least one boron salt such as ammonium biborate or ammonium pentaborate in an alkaline medium and in the presence of hydrogen peroxide and introducing a silicone type silicon compound into the solution and then dry impregnating, wherein the pore volume in the precursor is filled with the solution containing B and Si. This method produces a better distribution of boron and silicon deposits than the conventional method using an alcoholic solution of boric acid or a solution of ethyl orthosilicate in alcohol.

The boron and silicon, and optional phosphorous, and optionally the element selected from group VIIA, the halogen ions, preferably fluorine, can be introduced into the catalyst at various stages of its preparation and in a variety of manners.

The matrix is preferably impregnated using the "dry" impregnation method which is well known to the skilled person. Impregnation can be carried out in a single step using a solution containing all of the constituent elements of the final catalyst.

The boron and silicon, and optional phosphorous, and optionally the element selected from group VIIA, can be introduced into the calcined precursor by one or more impregnation steps using an excess of solution.

Thus, for example, in the preferred case where the precursor is a nickel-molybdenum type catalyst supported on a support formed of alumina and at least one dioctahedral 2:1 phyllosilicate, preferably synthesised in a fluoride medium (in the presence of hydrofluoric acid and/or another source of fluoride anions), optionally bridged, said phyllosilicate having a large interplanar spacing, it is possible to impregnate this precursor with an aqueous solution of ammonium biborate and Rhodorsil E1P silicone from Rhone Poulenc, to dry at 80° C., for example, then to impregnate with a solution of ammonium fluoride, to dry at 80° C., for example, and then to calcine, preferably carried out in air in a traversed bed, for example at 500° C. for 4 hours.

Other impregnation sequences can be carried out to obtain the catalyst of the present invention.

Thus it is possible to impregnate with the solution containing silicon, to dry, calcine then impregnate with the solution containing boron, to dry, then to carry out a final calcining step.

It is also possible to impregnate with the solution containing boron, to dry, calcine then impregnate with the solution containing silicon, to dry, then to carry out a final calcining step.

When preparing a catalyst containing phosphorous, it is also possible to impregnate the precursor with a solution containing phosphorous, to dry, calcine then to impregnate with the solution containing boron, to dry, calcine then impregnate with the solution containing silicon, to dry, then to carry out a final calcining step.

When the metals are introduced in a plurality of steps for impregnating the corresponding precursor salts, an intermediate catalyst drying step is generally carried out at a temperature which is generally in the range 60° C. to 250° C.

The preferred phosphorous source is orthophosphoric acid $H_3PO_4$, but its salts and esters such as ammonium phosphates are also suitable. Phosphorous can, for example, be introduced in the form of a mixture of phosphoric acid and a basic organic compound containing nitrogen, such as ammonia, primary and secondary amines, cyclic amines, pyridine group compounds, quinolines, and pyrrole group compounds.

A variety of silicon sources can be used. Examples are ethyl orthosilicate $Si(OEt)_4$, siloxanes, polysiloxanes, silicones, silicone emulsions and halogenated silicates such as ammonium fluorosilicate $(NH_4)_2SiF_6$ or sodium fluorosilicate $Na_2SiF_6$. Silicomolybdic acid and its salts, and silicotungstic acid and its salts can also advantageously be used. Silicon can be added, for example, by impregnating ethyl silicate in solution in a water/alcohol mixture. Silicon can be added, for example, by impregnation using an emulsion of a silicone in water.

The boron source can be boric acid, preferably orthoboric acid $H_3BO_3$, ammonium biborate or pentaborate, boron oxide, or boric esters. Boron can, for example, be introduced in the form of a mixture of boric acid, hydrogen peroxide and a basic organic compound containing nitrogen, such as ammonia, primary and secondary amines, cyclic amines, pyridine group compounds, quinolines, and pyrrole group compounds. Boron can, for example, be introduced using a solution of boric acid in a water/alcohol mixture.

Sources of group VIIA elements which can be used are well known to the skilled person. As an example, fluoride anions can be introduced in the form of hydrofluoric acid or its salts. Such salts are formed with alkali metals, ammonium or an organic compound. In the latter case, the salt is advantageously formed in the reaction mixture by reacting the organic compound with hydrofluoric acid. It is also possible to use hydrolysable compounds which can liberate fluoride anions in water, such as ammonium fluorosilicate (NH$_4$)$_2$SiF$_6$, silicon tetrafluoride SiF$_4$ or sodium fluorosilicate Na$_2$SiF$_6$. Fluorine can be introduced, for example, by impregnating with an aqueous hydrofluoride solution or ammonium fluoride.

Sources of group VIB elements which can be used are well known to the skilled person. Examples of molybdenum and tungsten sources are oxides and hydroxides, molybdic acids and tungstic acids and their salts, in particular ammonium salts such as ammonium molybdate, ammonium heptamolybdate, ammonium tungstate, phosphomolybdic acid, phosphotungstic acid and their salts. Preferably, oxides and ammonium salts are used, such as ammonium molybdate, ammonium heptamolybdate and ammonium tungstate.

The catalyst of the present invention can comprise at least one metal selected from group VIB and/or VIII elements; the group VIII metal is preferably iron, cobalt or nickel.

Advantageously, the following combinations of metals are used nickel-molybdenum, cobalt-molybdenum, iron-molybdenum, iron-tungsten, nickel-tungsten, cobalt-tungsten. Preferred combinations are: nickel-molybdenum and nickel-tungsten. It is also possible to use combinations of three metals, for example nickel-cobalt-molybdenum.

The sources of the group VIII elements which can be used are well known to the skilled person. Examples of sources of group VIII elements are nitrates, sulphates, phosphates, halides, for example chlorides, bromides and fluorides, and carboxylates, for example acetates and carbonates.

Sources of the group VIIB element which can be used are well known to the skilled person. Preferably, ammonium salts, nitrates and chlorides of group VIIB elements are used.

The catalyst of the present invention thus also comprises at least one amorphous or low crystallinity porous mineral matrix, generally an oxide. This matrix is normally selected from the group formed by aluminas, silicas and silica-aluminas or a mixture of at least two of the oxides cited above. Aluminates can also be used. Preferably, matrices containing alumina in any of its forms which are known to the skilled person, preferably gamma alumina, are used.

Advantageously, mixtures of alumina and silica and mixtures of alumina and silica-alumina can also be used.

Advantageously, mixtures of alumina and clay and mixtures of silica-alumina and clay can also be used.

Molybdenum impregnation can be facilitated by adding phosphoric acid to solutions of ammonium paramolybdate, which means that phosphorous can also be introduced, to promote the catalytic activity.

The catalysts of the present invention are formed into grains of different shapes and dimensions. They are generally used in the form of cylindrical or polylobed extrudates such as bilobes, trilobes, or polylobes with a straight or twisted shape, but they can also be produced and used in the form of compressed powder, tablets, rings, beads or wheels. The specific surface area is measured by nitrogen adsorption using the BET method (Brunauer, Emmett, Teller, J. Am. Chem. Soc., vol. 60, 309–316 (1938)) and is in the range 50 to 600 m$^2$/g, the pore volume measured using a mercury porisimeter is in the range 0.2 to 1.5 cm$^3$/g and the pore size distribution may be unimodal, bimodal or polymodal.

The invention also relates to processes for converting hydrocarbon-containing feeds using the catalyst described above, and in particular to hydrocracking processes.

The feeds used in the process are gasolines, kerosines, gas oils, vacuum gas oils, atmospheric residues, vacuum residues, atmospheric distillates, vacuum distillates, heavy fuels, oils, waxes and paraffins, spent oil, deasphalted residues or crudes, feeds from thermal cracking (without hydrogen) or fluidised bed catalytic cracking processes (FCC), and their mixtures. They contain heteroatoms such as sulphur, oxygen and nitrogen and possibly metals.

In particular, the catalysts obtained are advantageously used for hydrocracking vacuum distillate type heavy hydrocarbons, deasphalted residues or hydrotreated residues or the like. The heavy cuts are preferably constituted by at least 80% by volume of compounds with a boiling point of at least 350° C., preferably in the range 350° C. to 580° C. They generally contain heteroatoms such as sulphur and nitrogen. The nitrogen content is usually in the range 1 to 5000 ppm by weight and the sulphur content is in the range 0.01% to 5% by weight.

The hydrocracking conditions such as temperature, pressure, hydrogen recycle ratio, and hourly space velocity, can vary widely depending on the nature of the feed, the quality of the desired products and the facilities available to the refiner. The temperature is generally over 200° C. and usually in the range 250° C. to 480° C. The pressure is over 0.1 MPa and usually over 1 MPa. The hydrogen recycle ratio is a minimum of 50 and usually in the range 80 to 5000 normal litres of hydrogen per litre of feed. The hourly space velocity is generally in the range 0.1 to 20 volumes of feed per volume of catalyst per hour.

The catalysts of the present invention preferably undergo sulphurisation to transform at least part of the metallic species to the sulphide before bringing them into contact with the feed to be treated. This activation treatment by sulphurisation is well known to the skilled person and can be carried out using any method already described in the literature.

One conventional sulphurisation method which is well known to the skilled person consists of heating in the presence of hydrogen sulphide to a temperature in the range 150° C. to 800° C., preferably in the range 250° C. to 600° C., generally in a traversed bed reaction zone.

The catalyst of the present invention can advantageously be used for hydrocracking vacuum distillate type cuts containing large quantities of sulphur and nitrogen.

In a first implementation, or partial hydrocracking, also known as mild hydrocracking, the degree of conversion is below 55%. The catalyst of the invention is thus used at a temperature which is generally 230° C. or more, preferably 300° C., generally at most 480° C., and usually in the range 350° C. to 450° C. The pressure is generally over 2 MPa and preferably 3 MPa. The quantity of hydrogen is a minimum of 100 normal litres of hydrogen per litre of feed and usually in the range 200 to 3000 normal litres of hydrogen per litre of feed. The hourly space velocity is generally in the range 0.1 h$^{-1}$ to 10 h$^{-1}$. Under these conditions, the catalysts of the present invention have better activities for conversion, hydrodesulphuration and hydrodenitrogenation than commercially available catalysts.

In a second implementation, the catalyst of the present invention can be used for partial hydrocracking, advantageously under moderate hydrogen pressure conditions, of cuts such as vacuum distillates containing high sulphur and nitrogen contents which have already been hydrotreated. In this hydrocracking mode, the degree of conversion is below 55%. In this case, the petroleum cut is converted in two steps, the catalysts of the invention being used in the second step. The catalyst of the first step has a hydrotreatment function and comprises a matrix, preferably alumina-based, preferably containing no zeolite, and at least one metal with a hydrogenating function. Said matrix is selected from the group formed by alumina, silica, silica-alumina, magnesia, zirconia, titanium oxide and aluminates. The hydrotreatment function is ensured by at least one metal or compound of a metal from group VIII, such as nickel or cobalt. A combination of at least one metal or compound of a metal from group VI of the periodic table (in particular molybdenum or tungsten) and at least one metal or compound of a metal from group VIII (in particular cobalt or nickel) can be used. When the catalyst comprises a metal from group VI and a metal from group VIII, the total concentration of oxides of groups VI and VIII metals is in the range 5% to 40% by weight, preferably in the range 7% to 30% by weight, and the weight ratio, expressed as the metal oxide of the group VI metal (or metals) to that of the group VIII metal (or metals), is in the range 1.25 to 20, preferably in the range 2 to 10, Further, this catalyst can contain phosphorous. The phosphorous content in the finished catalyst, expressed as the concentration of phosphorous pentoxide $P_2O_5$, is generally at most 15%, preferably in the range 0.1% to 15% by weight, and more preferably in the range 0.15% to 10% by weight. The catalyst can also contain boron in a ratio B/P=1.05 to 2 (atomic), the sum of the B and P contents, expressed as the oxides, being between 5% and 15% by weight of the finished catalyst.

The first step is generally carried out at a temperature of 350° C. to 460° C., preferably 360° C. to 450° C.; the total pressure is at least 2 MPa, preferably at least 3 MPa; and the hourly space velocity is in the range 0.1 $h^{-1}$ to 5 $h^{-1}$, preferably in the range 0.2 $h^{-1}$ to 2 $h^{-1}$, with a quantity of hydrogen at least 100 normal litres per normal litre of feed, preferably in the range 260 to 3000 normal litres per normal litre of feed.

In the second implementation, in the conversion step using the catalyst of the invention (or second step), the temperatures are generally 230° C. or more and usually in the range 300° C. to 430° C. The pressure is generally at least 2 MPa, preferably at least 3 MPa; it is less than 12 MPa and preferably less than 10 MPa. The quantity of hydrogen is a minimum of 100 litres per litre of feed and usually in the range 200 to 3000 litres of hydrogen per litre of feed. The hourly space velocity is generally in the range 0.15 $h^{-1}$ to 10 $h^{-1}$. Under these conditions, the catalysts of the present invention have better activities for conversion, hydrodesulphuration, and hydrodenitrogenation and a better selectivity for middle distillates than commercially available catalysts. The service life of the catalysts is also improved in the moderate pressure range.

In a third implementation, the catalyst of the present invention can be used for hydrocracking under high hydrogen pressure conditions of at least 5 MPa, preferably at least 10 MPa, and advantageously at least 12 MPa. The treated cuts are, for example, vacuum distillates containing high sulphur and nitrogen contents which have already been hydrotreated. In this hydrocracking mode, the degree of conversion is 55% or more. In this case, the petroleum cut conversion process is carried out in two steps, the catalyst of the invention being used in the second step.

The catalyst used in the first step of the third implementation is identical to that used in the first step of the second implementation. It is used under the conditions described, the pressure being adjusted to that of the other implementation.

This first step is generally carried out at a temperature of 350–460° C., preferably 360–450° C., a pressure of over 3 MPa, an hourly space velocity of 0.1–5 $h^{-1}$, preferably 0.2–2 $h^{-1}$, and with a quantity of hydrogen of at least 100 Nl/l of feed, preferably 260–3000 Nl/Nl of feed.

For the conversion step using the catalyst of the invention (or second step), the temperatures are generally 230° C. or more, usually in the range 300° C. to 430° C. The pressure is in general more than 2 MPa, preferably more than 3 MPa. The quantity of hydrogen is a minimum of 100 litres per litre of feed, usually in the range 200 to 3000 litres of hydrogen per litre of feed. The hourly space velocity is generally in the range 0.15 to 10 $h^{-1}$.

Under these conditions, the catalysts of the present invention have better activities for conversion and better selectivity for middle distillates than commercially available catalysts, even with considerably lower zeolite contents than those of commercially available catalysts.

The following examples illustrate the present invention without in any way limiting its scope.

A dioctahedral 2:1 phyllosilicate, PDP, was prepared, which was a dioctahedral 2:1 phyllosilicate in the ammonium form.

The following were successively added to 36 g of distilled water:
- 0.385 g of $NH_4F$ salt (Prolabo), with moderate stirring;
- 0.312 g of HF acid, 40% (Fluka);
- 2.71 g of the hydrated oxyhydroxide AlOOH (Catapal B Vista), with vigorous stirring;
- 2.50 g of powdered $SiO_2$ oxide (Aerosil 130 from Degussa), with moderate stirring.

The composition of the hydrogel thus prepared, with respect to one mole of oxide $SiO_2$, was;

1.0 $SiO_2$; 0.44$Al_2O_3$; 0.25 NaF; 0.15 HF; 48 $H_2O$ giving, in molar terms:

| | | |
|---|---|---|
| Si/Al | = | 1.136 |
| $NH_4^+$/Si | = | 0.25 |
| F/Si | = | 0.40 |
| HF/Si | = | 0.15 |
| $H_2O$/Si | = | 48 |

This composition did not take into account the water provided by the aluminium source and the HF acid.

The hydrogel obtained was aged for 4 hours at ambient temperature (20° C.) with moderate stirring. The pH was close to 5.

Crystallisation was then carried out at 220° C. in a 120 ml steel autoclave lined with a Teflon coating, under autogenous pressure, for 168 hours, without stirring. The autoclave was then cooled in air. The pH at the end of the synthesis was about 5.5.

The product was recovered, filtered and washed with copious quantities of distilled water. It was then dried at 40–50° C. for 24 hours. After 24 hours, the product obtained, with 50% relative humidity, was characterised by its X ray diffraction spectrum, shown below (Table 1).

TABLE 1

| $d_{hkl}$ ($10^{-10}$) | I/I$_o$ |
|---|---|
| 10.87 | 73 |
| 5.32 | 12 |
| 4.46 | 100 |
| 2.58 | 30 |
| 2.56 | 43 |
| 2.2 | 46 |
| 2.1 | 77 |
| 2.0 | 77 |
| 1.69 | 11 |
| 1.49 | 22 |

The fluorine content of the phyllosilicate obtained was 2.9% by weight. For $^{19}F$ NMR with magic angle spinning of the phyllosilicate prepared in this example, a signal was present at −133 ppm.

The prepared dioctahedral 2:1 phyllosilicate in its ammonium form was termed PD. This latter then underwent a bridging step using the procedure described below. 8 g of the prepared dioctahedral 2:1 phyllosilicate PD was suspended in 80 ml of a hexadecyltrimethylammonium (CTMA-CI) solution with a concentration of 0.1M. After 1 hour of stirring at room temperature, it was filtered, washed with twice 200 ml of distilled water then dried at 60° C. for 8 hours. The PD sample previously treated with CTMA was suspended in a mixture composed of 4.48 g of octylamine ($C_8H_{17}NH_2$) and 60.32 g of ethyl tetraorthosilicate ($Si(OEt)_4$), and 2.96 g of aluminium isopropoxide After 30 minutes stirring, it was filtered then dried at 60° C. for 8 hours. The sample was calcined at 530° C. for 3 hours in air then for 2 hours in pure oxygen. The $d_{001}$ of the sample after calcining was 31.2 Å and its specific surface area was 375 m$^2$/g. The prepared dioctahedral 2:1 phyllosilicate was termed PDP.

Large quantities of a hydrocracking catalyst containing dioctahedral 2:1 phyllosilicate PD were produced so as to enable different catalysts based on the same support to be prepared. To this end, 19.3% by weight of dioctahedral 2:1 phyllosilicate PD was mixed with 80.7% by weight of a matrix composed of ultrafine tabular boehmite or alumina gel sold by Condéa Chemie GmbH under the trade name SB3. This powder mixture was then mixed with an aqueous solution containing 66% nitric acid (7% by weight of acid per gram of dry gel) then milled for 15 minutes. After milling, the paste obtained was passed through a die with cylindrical orifices with a diameter of 1.4 mm. The extrudates were dried overnight at 120° C. then calcined at 550° C. for 2 hours in air.

Large quantities of a hydrocracking catalyst containing bridged dioctahedral 2:1 phyllosilicate PDP were produced so as to enable different catalysts based on the same support to be prepared. To this end, 20.5% by weight of bridged dioctahedral 2:1 phyllosilicate PDP was mixed with 79.5% by weight of a matrix composed of ultrafine tabular boehmite or alumina gel sold by Condéa Chemie GmbH under the trade name SB3. This powder mixture was then mixed with an aqueous solution containing 66% nitric acid (7% by weight of acid per gram of dry gel) then milled for 15 minutes. After milling, the paste obtained was passed through a die with cylindrical orifices with a diameter of 1.4 mm. The extrudates were dried overnight at 120° C. then calcined at 550° C. for 2 hours in air.

EXAMPLE 1

Preparation of catalysts containing a bridged dioctahedral 2:1 phyllosillcate

Extrudates of the support containing bridged dioctahedral 2:1 phyllosilicate PDP prepared as described above were dry impregnated with an aqueous solution of a mixture of ammonium heptamolybdate and nickel nitrate, dried overnight at 120° C. in air and finally calcined at 550° C. in air. The oxide weight contents of the catalyst obtained are shown in Table 2. The final catalyst CZ14 contained 17.4% by weight of bridged dioctahedral 2:1 phyllosilicate PDP.

Extrudates of the support containing bridged dioctahedral 2:1 phyllosilicate PDP were dry impregnated with an aqueous solution of a mixture of ammonium heptamolybdate, nickel nitrate and orthophosphoric acid, dried overnight at 120° C. in air and finally calcined at 550° C. in air. Catalyst CZ14P was obtained.

We impregnated a sample of catalyst CZ14P described above with an aqueous solution comprising ammonium biborate. After ageing at room temperature in an atmosphere saturated with water, the impregnated extrudates were dried overnight at 120° C. then calcined at 550° C. for 2 hours in dry air. Catalyst CZ14PB was obtained: NiMo/alumina-beidellite doped with boron.

A catalyst CZ14PSi was obtained using the same procedure as that for CZ14PB above, replacing the boron precursor in the impregnation solution with a Rhodorsil EP1 (Rhone Poulenc) silicone emulsion.

Finally, a catalyst CZ14PBSi was obtained by impregnating catalyst CZ14P an aqueous solution comprising ammonium biborate and a Rhodorsil EP1 silicone emulsion (Rhone Poulenc). The other steps of the procedure were the same as those indicated above. Fluorine was then added to this catalyst by impregnating with a solution of dilute hydrofluoric acid to deposit about 1% by weight of fluorine. After drying overnight at 120° C. and calcining at 550° C. for 2 hours in dry air, catalyst CZ14PBSiF was obtained. The final oxide contents of catalysts CZA are shown in Table 2.

TABLE 2

Characteristics of CZ14 catalysts

| Catalyst | CZ14 | CZ14 PB | CZ14 PSi | CZ14 PBSi | CZ14 PBSiF |
|---|---|---|---|---|---|
| MoO$_3$ (wt %) | 12.3 | 11.6 | 11.6 | 11.4 | 11.2 |
| NiO (wt %) | 2.8 | 2.7 | 2.7 | 2.6 | 2.6 |
| P$_2$O$_5$ (wt %) | 0 | 4.7 | 4.7 | 4.6 | 4.6 |
| B$_2$O$_3$ (wt %) | 0 | 1.9 | 0 | 1.8 | 1.8 |
| SiO$_2$ (wt %) | 11.6 | 10.8 | 12.6 | 12.3 | 12.1 |
| F (wt %) | 0 | 0 | 0 | 0 | 1.5 |
| Complement to 100%, mainly composed of Al$_2$O$_3$ (wt %) | 73.3 | 68.3 | 68.4 | 67.3 | 66.2 |

Catalyst CZ14P was then impregnated with an aqueous solution comprising manganese nitrate. After ageing at room temperature in an atmosphere saturated with water, the impregnated extrudates were dried overnight at 120° C. then calcined at 550° C. for 2 hours in dry air. Catalyst CZ14PMn was obtained. This catalyst was then impregnated with an aqueous solution comprising ammonium biborate and Rhodorsil EP1 silicone emulsion (Rhone-Poulenc). The impregnated extrudates were dried overnight at 120° C. then calcined at 550° C. for 2 hours in dry air to produce catalyst CZ14PMnBSi. Fluorine was then added to this catalyst by impregnating with a solution of dilute hydrofluoric acid to deposit about 1% by weight of fluorine. After drying overnight at 120° C. and calcining at 550° C. for 2 hours in dry air, catalyst CZ14PMnBSiF was obtained. The oxide contents of these catalysts are shown in Table 3.

TABLE 3

Characteristics of CZ14 catalysts containing manganese

| Catalyst | CZ14 PMnBSi | CZ14 PMnBSiF |
|---|---|---|
| MoO$_3$ (wt %) | 11.1 | 10.9 |
| NiO (wt %) | 2.5 | 2.5 |
| MnO$_2$ (wt %) | 1.9 | 1.9 |

TABLE 3-continued

Characteristics of CZ14 catalysts containing manganese

| Catalyst | CZ14 PMnBSi | CZ14 PMnBSiF |
|---|---|---|
| $P_2O_5$ (wt %) | 4.7 | 4.6 |
| $B_2O_3$ (wt %) | 1.7 | 1.8 |
| $SiO_2$ (wt %) | 12.1 | 11.9 |
| F (wt %) | 0 | 1.6 |
| Complement to 100%, mainly composed of $Al_2O_3$ (wt %) | 66.0 | 64.8 |

Electronic microprobe analysis of catalysts CZ14PSi, CZ14PBSi, CZ14PBSiF (Table 2) and catalysts CZ14PMnBSi, CZ14PMnBSiF (Table 3) showed that the silicon added to the catalyst of the invention was principally located on the matrix and was in the form of amorphous silica.

EXAMPLE 2

Preparation of catalysts containing a non-bridged dioctahedral 2:1 phyllosilicate Extrudates of the support containing non-bridged dioctahedral 2:1 phyllosilicate PD prepared as described above were dry impregnated with an aqueous solution of a mixture of ammonium heptamolybdate, nickel nitrate and orthophosphoric acid, dried overnight at 120° C. in air and finally calcined at 550° C. in air. Catalyst CZ19P was obtained.

Catalyst CZ19P was then impregnated with an aqueous solution comprising ammonium biborate and a Rhodorsil EP1 silicone emulsion (Rhone Poulenc). The impregnated extrudates were then dried overnight at 120° C. and calcined at 550° C. for 2 hours in dry air; catalyst CZ19PBSi was obtained.

TABLE 4

Characteristics of CZ19 catalysts

| Catalyst | CZ19 P | CZ19 PBSi |
|---|---|---|
| $MoO_3$ (wt %) | 12.0 | 11.6 |
| NiO (wt %) | 2.8 | 2.7 |
| $P_2O_5$ (wt %) | 4.6 | 4.4 |
| $B_2O_3$ (wt %) | 0 | 1.9 |
| $SiO_2$ (wt %) | 7.3 | 8.7 |
| Complement to 100%, mainly composed of $Al_2O_3$ (wt %) | 73.3 | 70.7 |

Electronic microprobe analysis of catalyst CZ19PBSi (Table 4) showed that the silicon added to the catalyst of the invention was principally located on the matrix and was in the form of amorphous silica.

EXAMPLE 3

Comparison of catalysts for partial conversion hydrocracking of a vacuum gas oil The catalysts prepared in the above Examples were employed under moderate pressure hydrocracking conditions using a petroleum feed with the following principal characteristics:

| Density (20/4) | 0.921 |
|---|---|
| Sulphur (weight %) | 2.46 |
| Nitrogen (ppm by weight) | 1130 |
| Simulated distillation | |
| Initial point | 365° C. |
| 10% point | 430° C. |
| 50% point | 472° C. |
| 90% point | 504° C. |
| End point | 539° C. |
| Pour point | +39° C. |

The catalytic test unit comprised two fixed bed reactors in upflow mode. The catalyst for the first hydrotreatment step of the process, HTH548 from Procatalyse, comprising a group VI element and a group VIII element deposited on alumina, was introduced into the first reactor, through which the feed passed first. A hydrocracking catalyst as described above was introduced into the second reactor, through which the feed passed last. 40 ml of catalyst was introduced into each of the reactors. The two reactors operated at the same temperature and the same pressure. The operating conditions of the test unit were as follows:

| Total pressure | 5 MPa |
|---|---|
| Hydrotreatment catalyst | 40 cm³ |
| Hydrocracking catalyst | 40 cm³ |
| Temperature | 400° C. |
| Hydrogen flow rate | 20 1/h |
| Feed flow rate | 40 cm³/h |

The two catalysts underwent in-situ sulphurisation before the reaction. It should be noted that any in-situ or ex-situ sulphunsation method is suitable. Once sulphurisation had been carried out, the feed described above could be transformed.

The catalytic performances are expressed as the gross conversion at 400° C. (GC), the gross selectivity for middle distillates (GS) and the hydrodesulphuration (HDS) and hydrodenitrogenation (HDN) conversions. These catalytic performances were measured for the catalyst after a stabilisation period, generally of at least 48 hours, had passed.

The gross conversion GC is taken to be:

GC=weight % of 380° C. of effluent.

380° C. represents the fraction boiling below 380° C.

The gross selectivity GS for middle distillates is taken to be;

GS=100* weight of (150° C.–380° C.) fraction/weight of 380° C. fraction of effluent.

The hydrodesulphuration conversion HDS is taken to be:

$HDS = (S_{initial} - S_{effluent})/S_{initial} * 100 = (24600 - S_{effluent})/24600 * 100$ The hydrodenitrogenation conversion HDN is taken to be:

$HDN = (N_{initial} - N_{effluent})/N_{initial} * 100 = (1130 - N_{effluent})/1130 * 100$ Table 5 below shows the gross conversion GC at 400° C., the gross selectivity GS, the hydrodesulphuration conversion HDS and the hydrodenitrogenation conversion HDN for the four catalysts.

TABLE 5

Catalytic activities of catalysts for partial hydrocracking at 400° C.

|  |  | GC (wt %) | GS (%) | HDS (%) | HDN (%) |
|---|---|---|---|---|---|
| CZ14 | NiMo/PDP | 42.9 | 81.0 | 98.1 | 92.5 |
| CZ14PB | NiMoPB/PDP | 43.5 | 81.8 | 98.57 | 94.2 |
| CZ14PSi | NiMoPSi/PDP | 43.8 | 81.9 | 98.56 | 94.8 |
| CZ14PBSi | NiMoPBSi/PDP | 44.7 | 81.1 | 98.73 | 96.6 |

The results of Table 5 show that combining the two dopants B and/or Si improves the performances of the catalyst containing a bridged dioctahedral 2:1 phyllosilicate for conversion. The gross selectivity for middle distillates reduced because of the increase in the degree of conversion, as is well known. The catalysts of the invention containing boron and/or silicon are thus or particular interest for partial hydrocricking of a vacuum distillate type feed containing nitrogen at a moderate hydrogen pressure.

EXAMPLE 4

High conversion hydrocracking tests carried out on a vacuum gas oil

The catalysts prepared as described above were used under high conversion (60–100%) hydrocracking conditions on a vacuum distillate type feed with a high sulphur and nitrogen content with the following principal characteristics:

| Density at 15° C. | 0.912 |
|---|---|
| Sulphur | 2.22% by weight |
| Total Nitrogen | 598 ppm by weight |
| Simulated distillation | |
| Initial point | 345° C. |
| 10% point | 375° C. |
| 50% point | 402° C. |
| 90% point | 428° C. |
| End point | 467° C. |

The catalytic test unit comprised a fixed bed reactor operating in upflow mode. The hydrocracking test was carried out under the following operating conditions:

| Total pressure | 20 MPa |
|---|---|
| Catalyst volume | 40 cm$^3$ |
| Temperature | 370–420° C. |
| Hydrogen flow rate | 24 l/h |
| Feed flow rate | 20 cm$^3$/h |

Each catalyst was sulphurised before the test at 350° C. and at a total pressure of 20 MPa using the feed to which 2% by weight of dimethyldisulphide (DMDS) had been added.

Under these conditions, the catalytic performances for hydrodesulphuration (HDS) and hydrodenitrogenation (HDN) were such that the sulphur and nitrogen contents in the effluent were below the detection limit of standard analysis techniques. This observation is normal taking into account the high pressure of the hydrogen used. The gross conversion (GC) is of principal interest. These catalytic performances were measured using the catalyst after a stabilisation period, generally of at least 48 hours, had passed.

The gross conversion GC is taken to be:
GC=weight % of 380° C. of effluent.

Table 6 below shows the gross conversion GC at 410° C. for the catalysts tested under these conditions and the gross selectivity for middle distillates (150–380° C.).

TABLE 6

Catalytic activities of catalysts for high conversion hydrocracking

|  |  | GC | GS (%) |
|---|---|---|---|
| CZ14 | NiMo/PDP | 76.1 | 70.3 |
| CZ14PB | NiMoPB/PDP | 78.3 | 69.2 |
| CZ14PSi | NiMoPSi/PDP | 80.1 | 68.3 |
| CZ14PBSi | NiMoPBSi/PDP | 84.2 | 66.8 |
| CZ14PBSiF | NiMoPBSiF/PDP | 85.1 | 66.2 |
| CZ19P | NiMoP/PD | 75.2 | 71.1 |
| CZ19PBSi | NiMoPBSi/PD | 81.2 | 68.0 |
| CZ14PMnBSi | NiMoPMnBSi/PDP | 84.9 | 66.5 |
| CZ14PMnBSiF | NiMoPMnBSiF/PDP | 86.0 | 65.7 |

Adding boron and/or silicon to the catalyst containing a bridged dioctahedral 2:1 phyllosilicate improved the conversion activity, meaning an increase in the degree of conversion at 410° C. The gross selectivity for middle distillates reduced because of the increase in the degree of conversion, as is well known.

Catalyst CZ14PBSi containing boron and silicon was thus of particular interest for use in processes for hydrocracking vacuum distillate type feeds with a high sulphur and nitrogen content, generally termed hydrocracking using an amorphous catalyst at a high hydrogen pressure.

Similarly, adding boron and silicon to catalyst CZ19P containing non bridged dioctahedral 2:1 phyllosilicate improved the conversion activity, which resulted in an increase in the degree of conversion at 410° C. The gross selectivity for middle distillates reduced because of the increase in the degree of conversion, as is well known.

Further, if manganese and/or fluorine was added, an improvement in the degree of conversion and thus in the converting activity was also observed.

What is claimed is:

1. A process for hydrocracking conversion, comprising subjecting a hydrocarbon feed to conversion conditions in the presence of a catalyst comprising at least one group VIB or group VIII metal and at least one support containing at least one porous matrix formed by an amorphous or low crystallinity matrix and at least one dioctahedral 2:1 phyllosilicate or trioctahedral 2:1 phyllosilicate bridged clay, the support further containing at least one boron or silicon promoter metal.

2. A process according to claim 1, wherein the catalyst contains at least one bridged dioctahedral 2:1 phyllosilicate with an interplanar spacing of at least $2.0 \times 10^{-9}$ m and containing struts based on at least one of $SiO_2$, $Al_2O_3$, $ZrO_3$, or $V_2O_3$.

3. A process according to claim 1, wherein the catalyst contains phosphorous.

4. A process according to claim 1, wherein the catalyst contains at least one group VIIA element, halogen, or group VIB element.

5. A process according to claim 1, wherein the catalyst contains 0.1% to 60% of at least one group VIB or group VIII metal (as a % of oxide); 0.1% to 99% of at least one amorphous or low crystallinity porous mineral matrix; 0.1% to 90% of at least one dioctahedral 2:0 phyllosilicate; and 0.1% to 20% (as a % of oxide) of at least one boron or silicon promoter metal.

6. A process according to claim 1, wherein the catalyst contains phosphorous in a percentage, expressed as the percentage of oxides, of 0 to 20%.

7. A process according to claim 1, wherein the catalyst contains at least one group VIIA element, halogen or group VIIB element, the group VIIA element being present in an amount of 1 to 20% and the group VIIB metal being present in a percentage, expressed as the percentage of oxide, of 0 to 20%.

8. A process according to claim 1, wherein the catalyst is prepared by a process in which a support is prepared which comprises an amorphous or low crystallinity matrix, at least one dioctahedral 2:1 phyllosilicate or trioctahedral 2:1 phyllosilicate clay, on which at least one group VIB or group VII metal is deposited, and the support is impregnated with at least one aqueous solution of boron or silicon.

9. A process according to claim 1, wherein the catalyst is prepared by a process comprising depositing a group VIB or VIII metal and boron or silicon on a support comprising an amorphous or low crystallinity porous matrix and at least one diotahedral 2:1 phyllosilicate or tetrahedral 2:1 phyllosilicate clay.

10. A process according to claim 1, wherein the promoter metal is principally deposited on the matrix.

11. A process according to claim 1, wherein the clay is a diotahedral 2:1 phyllosilicate prepared in a fluoride medium.

12. A process according to claim 1, in which the group VIB and group VIII elements are nickel-molybdenum, nickel-tungsten, cobalt-molybdenum, cobalt-tungsten or nickel-cobalt-molybdenum combinations.

13. A process according to claim 1, comprising subjecting said feed to hydrocracking conditions.

14. A process according to claim 1, wherein the catalyst contains a group VIB metal.

15. A process according to claim 1, wherein the catalyst is further impregnated with at least one solution of a group VII A element.

* * * * *

UNITED STATES PATENT AND TRADEMARK OFFICE
CERTIFICATE OF CORRECTION

PATENT NO. : 6,527,945 B2
DATED : March 4, 2003
INVENTOR(S) : Eric Benazzi et al.

It is certified that error appears in the above-identified patent and that said Letters Patent is hereby corrected as shown below:

<u>Title page,</u>
Item [75], Inventors, reads "Malmaison" should read -- Reuil Malmaison --
Item [73], Assignee, reads "Malmaison" should read -- Reuil Malmaison --

<u>Column 19,</u>
Line 19, reads "diotahedral" should read -- dictahedral --

<u>Column 20,</u>
Line 4, reads "diotahedral" should read -- dictahedral --
Line 7, reads "group VIII" should read -- group VII --

Signed and Sealed this

Eighteenth Day of May, 2004

JON W. DUDAS
*Acting Director of the United States Patent and Trademark Office*